United States Patent
Sacripante et al.

(10) Patent No.: US 8,815,000 B1
(45) Date of Patent: Aug. 26, 2014

(54) SOLID INKS COMPRISING LIQUID CRYSTALLINE MATERIALS

(71) Applicant: Xerox Coporation, Norwalk, CT (US)

(72) Inventors: Guerino G. Sacripante, Oakville (CA);
Stephan V. Drappel, Toronto (CA);
Daryl W. Vanbesien, Burlington (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/767,812

(22) Filed: Feb. 14, 2013

(51) Int. Cl.
*C09D 11/02* (2014.01)
*C09D 11/00* (2014.01)

(52) U.S. Cl.
CPC ..................................... *C09D 11/34* (2013.01)
USPC ..................................... 106/31.29; 106/31.61

(58) Field of Classification Search
USPC .............................. 106/31.29, 31.61; 347/99
See application file for complete search history.

(56) References Cited

U.S. PATENT DOCUMENTS

| | | | |
|---|---|---|---|
| 4,490,731 A | 12/1984 | Vaught | |
| 5,195,430 A | 3/1993 | Rise | |
| 5,231,135 A | 7/1993 | Machell | |
| 5,389,958 A | 2/1995 | Bui | |
| 5,621,022 A | 4/1997 | Jaeger | |
| 5,876,492 A * | 3/1999 | Malhotra et al. | 106/31.58 |
| 5,958,119 A * | 9/1999 | Malhotra et al. | 106/31.43 |
| 6,221,137 B1 | 4/2001 | King | |
| 6,472,523 B1 | 10/2002 | Banning | |
| 6,476,219 B1 | 11/2002 | Duff | |
| 6,576,747 B1 | 6/2003 | Carlini | |
| 6,576,748 B1 | 6/2003 | Carlini | |
| 6,590,082 B1 | 7/2003 | Banning | |
| 6,646,111 B1 | 11/2003 | Carlini | |
| 6,663,703 B1 | 12/2003 | Wu | |
| 6,673,139 B1 | 1/2004 | Wu et al. | |
| 6,696,552 B2 | 2/2004 | Mayo | |
| 6,713,614 B2 | 3/2004 | Carlini | |
| 6,726,755 B2 | 4/2004 | Titterington | |
| 6,755,902 B2 | 6/2004 | Banning | |
| 6,821,327 B2 | 11/2004 | Jaeger | |
| 6,958,406 B2 | 10/2005 | Banning | |
| 7,053,227 B2 | 5/2006 | Jaeger | |
| 7,381,831 B1 | 6/2008 | Banning | |
| 7,427,323 B1 | 9/2008 | Birau | |

OTHER PUBLICATIONS

Douglass et al. "An assessment of carborane-containing liquid crystals for potential device application" Journal Mater. Chem., 1998, 8(11), 2391-2398.

* cited by examiner

*Primary Examiner* — Veronica F Faison
(74) *Attorney, Agent, or Firm* — Pillsbury Winthrop Shaw Pittman LLP

(57) ABSTRACT

A solid ink composition used for ink jet printing. In particular, the solid inks comprise a liquid crystalline material that can be jetted in a molten, amorphous state at elevated temperatures, electrically poled to align the molecules in an intermediate liquid crystalline state at lower temperatures, and then frozen into a robust, high quality image upon cooling.

20 Claims, 2 Drawing Sheets

SOLID INKS COMPRISING LIQUID CRYSTALLINE MATERIALS

BACKGROUND

The present embodiments relate to solid ink compositions characterized by being solid at room temperature and molten at an elevated temperature at which the molten ink is applied to a substrate. These solid ink compositions can be used for ink jet printing. The present embodiments are directed to a novel solid ink composition comprising a liquid crystalline material that can be jetted in a molten, amorphous state at elevated temperatures, electrically poled to align the molecules in an intermediate liquid crystalline state at lower temperatures, and then frozen into a robust, high quality image upon cooling. In addition, the specific formulations described herein have the advantage of being a single component ink based on the liquid crystalline component, which has cost advantages over multicomponent blends currently available.

Ink jet printing processes may employ inks that are solid at room temperature and liquid at elevated temperatures. Such inks may be referred to as phase change inks, hot melt inks, solid inks and the like. For example, U.S. Pat. No. 4,490,731, the disclosure of which is totally incorporated herein by reference, discloses an apparatus for dispensing solid ink for printing on a recording medium such as paper. In piezo ink jet printing processes employing hot melt inks, the solid ink is melted by the heater in the printing apparatus and utilized (jetted) as a liquid in a manner similar to that of conventional piezo ink jet printing. Upon contact with the printing recording medium, the molten ink solidifies rapidly, enabling the colorant to substantially remain on the surface of the recording medium instead of being carried into the recording medium (for example, paper) by capillary action, thereby enabling higher print density than is generally obtained with liquid inks. Advantages of a solid ink in ink jet printing are thus elimination of potential spillage of the ink during handling, a wide range of print density and quality, minimal paper cockle or distortion, and enablement of indefinite periods of nonprinting without the danger of nozzle clogging, even without capping the nozzles.

In general, solid inks (sometimes referred to as "hot melt inks" or "phase change inks") are in the solid phase at ambient temperature, but exist in the liquid phase at the elevated operating temperature of an ink jet printing device. At the jetting temperature, droplets of liquid ink are ejected from the printing device and, when the ink droplets contact the surface of the recording medium, either directly or via an intermediate heated transfer belt or drum, they quickly solidify to form a predetermined pattern of solidified ink drops.

Solid inks for color printing typically comprise a solid ink carrier composition which is combined with a solid ink compatible colorant. In a specific embodiment, a series of colored solid inks can be formed by combining ink carrier compositions with compatible subtractive primary colorants. The subtractive primary colored solid inks can comprise four component dyes or pigments, namely, cyan, magenta, yellow and black, although the inks are not limited to these four colors. These subtractive primary colored inks can be formed by using a single dye or pigment or a mixture of dyes or pigments.

Solid inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in solid ink jet printers wherein the ink droplets are applied directly onto the final recording medium (for example, paper, transparency material, and the like), the droplets solidify immediately upon contact with the recording medium, so that migration of ink along the printing medium is prevented and dot quality is improved.

While the above conventional solid ink technology is generally successful in producing vivid images and providing economy of jet use and substrate latitude on porous papers, there is always a desire to improve the current technology in terms of image quality, reduced cost, environmental friendliness and the like. Thus, while known compositions and processes are suitable for their intended purposes, a need remains for additional means for forming images or printing on coated paper substrates.

Each of the foregoing U.S. patents and patent publications are incorporated by reference herein. Further, the appropriate components and process aspects of the each of the foregoing U.S. patents and patent publications may be selected for the present disclosure in embodiments thereof.

SUMMARY

According to embodiments illustrated herein, there is provided a solid ink composition comprising: a liquid crystalline component; and an optional colorant, wherein the solid ink composition is a solid at room temperature and liquid at a temperature of 80° C. or higher.

In particular, the present embodiments provide a solid ink comprising: a solid ink composition comprising: a liquid crystalline component, wherein the liquid crystalline component is selected from the group consisting of trans-trans-4'alkyl-4-cyanobicyclohexys, p-ethoxybenzylidene-p-n-butylaniline, anisylidine-p-aminophenylacetate, p-cyanobenzylidene-p-n-octyloxyaniline, p,p'-di-dodecyloxyazoxybenzene, azomethines, azobenzene derivatives, phenylbenzoates, hetro substituted naphthalenes, fluorenes, p,p'-disubstituted phenyl benzoates, p-phenyl-2-naphthoates, biphenyl cinnamates, substituted diphenyl terephthalates, p-phenylbenzylphenyl ethers, styrylbenzthiazoles, p-substituted-cinnamic acids and esters, and mixtures thereof; and an optional colorant, wherein the solid ink composition is a solid at room temperature and liquid at a temperature of 80° C. or higher.

In further embodiments, there is provided a solid ink comprising a process of using a solid ink composition comprising: jetting a solid ink composition onto a substrate to form an ink film on the substrate at a temperature of from about 60 to about 140° C., the solid ink composition comprising a liquid crystalline component, and an optional colorant, wherein the solid ink composition is a solid at room temperature and liquid at a temperature of 80° C. or higher and further wherein the liquid crystalline component is in a nematic or isotropic phase when jetted; cooling the ink film to a temperature of from about 40 to about 100° C., wherein the liquid crystalline component is in a smectic or crystalline phase; exposing the ink film to an electrostatic field to align the liquid crystals of the liquid crystalline component; and further cooling the ink film to a temperature of from about 20 to about 40° C., wherein the liquid crystalline component is in an isotropic phase.

BRIEF DESCRIPTION OF THE DRAWINGS

For a better understanding of the present embodiments, reference may be had to the accompanying figures.

DETAILED DESCRIPTION

Figure 1:
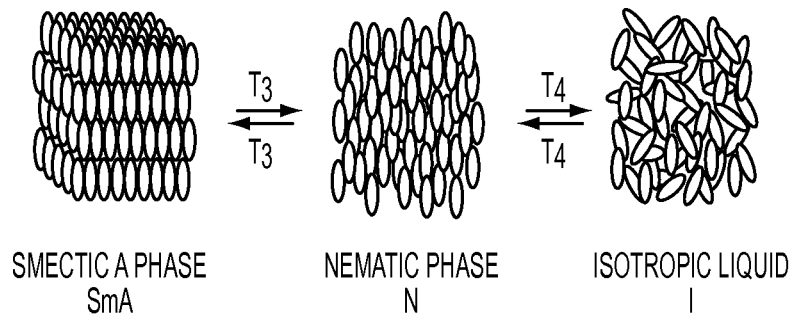
FIG. 1 is an illustration depicting the various states of a liquid crystalline material.

In the following description, it is understood that other embodiments may be utilized and structural and operational changes may be made without departure from the scope of the present embodiments disclosed herein.

Solid or phase change ink technology broadens printing capability and customer base across many markets, and the diversity of printing applications will be facilitated by effective integration of printhead technology, print process and ink materials. The solid ink compositions are characterized by being solid at room temperature (RT) (e.g., 20-25° C.) and molten at an elevated temperature, such as 80° C. or higher, at which the molten ink is applied to a substrate. As discussed above, while current ink options are successful for porous paper substrates, these options are not always satisfactory for coated paper substrates.

Conventional solid ink technology has been successful in producing vivid images and providing economy of jet use and substrate latitude on porous papers. However, such technology has not been satisfactory for coated substrates. Thus, while known compositions and processes are suitable for their intended purposes, a need remains for additional means for forming images or printing on coated paper substrates. As such, there is a need to find alternative compositions for solid ink compositions and future printing technologies to provide customers with excellent image quality on all substrates, including selecting and identifying different classes of materials that are suitable for use as desirable ink components. There is a further need for printing these inks at high speeds as required by digital presses in production environment.

The present inventors have discovered a liquid crystalline material can be used as the ink vehicle of solid inks which allows the ink to be aligned in an external electric field and which creates an ink more robust than achieved by previous solid inks. The robust image created is resistant to image scratch, smear and offset. The solid inks comprising the liquid crystalline materials can be jetted in a molten, amorphous state at elevated temperatures, then cooled to an intermediate liquid crystalline state at a lower temperature during which the applied ink film can be electrically poled to align the molecules and then eventually frozen into a robust image upon cooling. The formed image has a more ordered molecular structure that is more mechanically robust due to the molecular alignment.

The ink during the intermediate liquid crystalline state is exposed to an electrostatic field, wherein the liquid crystal (LC) carrier or vehicle can align. The electrostatic field poles the liquid crystals to align and crystallize rapidly in a smectic or nematic state, before the image solidifies into a semi-crystalline or amorphous state. The alignment helps to increase the mechanical properties of the ink such that it does not smear, scratch or offset.

Another advantage of the present embodiments is that the ink requires a single ink carrier or vehicle component, the liquid crystalline materials, which can provide both the amorphous properties and crystalline properties required for the phase changes. A single component ink such as the present embodiments provides a significant cost advantage over multiple component inks currently available. Further advantages include the fact that the present embodiments provide solid inks with desirable melting and rheological properties that are also miscible with wax, colorants and other ink additives.

For solid inkjet technology, critical materials requirements of an ink include a viscosity of less than 15 cps at a jetting temperature of about 120° C., and the ability to solidify within 2-3 seconds when jetted on paper. Current materials utilized in solid inkjet technology are mainly comprised of crystalline or semi-crystalline organic molecules with molecular weights of less than 1,000 grams/mole in order to satisfy these requirements. Due to the highly crystalline nature of such molecules, the resulting ink often does not possess the robustness properties, for example, smear, fold offset, and scratch, that are required for many applications, especially those for printing on coated substrates. In contrast, xerographic toner materials are amorphous and do possess the required robustness. However, while these amorphous materials are of high molecular weight, they do not possess the required rheology for solid ink printing. Recently, the combination of compatible amorphous materials with crystalline materials has improved the robustness properties. However, there is a desire to further the robustness achieved. Attempts to add more than 20% of amorphous materials to improve robustness proved to be challenging because the resulting rheological or solidification time was not acceptable.

The solid inks of the present embodiments comprise a single ink carrier or vehicle component, based on liquid crystals. These materials are a state of matter that have properties between those of a conventional liquid and those of a solid crystal. For instance, a liquid crystal may flow like a liquid, but its molecules may be oriented in a crystal-like way. The two states of interest are either the Smectic state (2-dimensional order) or the Nematic State (1-dimensional order), that are between the crystalline and amorphous state (Isotropic), as shown in FIG. 1. Nematic materials possess superior mechanical properties (ie., Kevlar), and thus, such materials impart more robust images for solid ink-jet technology.

Figure 2:
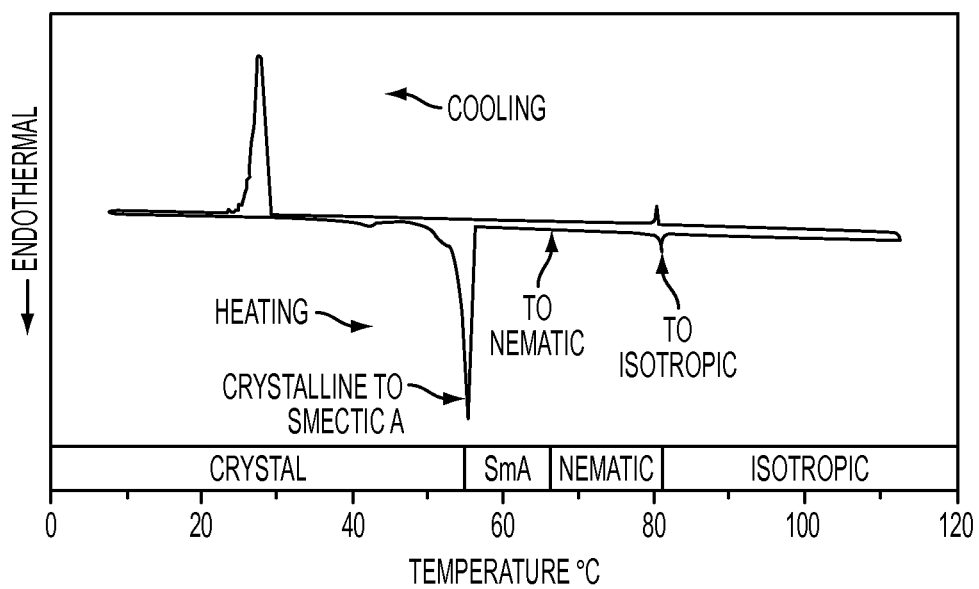
FIG. 2 is a graph illustrating a typical differential scanning calorimetry (DSC) profile of a liquid crystalline molecule.

FIG. 2 depicts a typical differential scanning calorimetry (DSC) profile, showing temperature versus enthalpy, of a liquid crystalline molecule. As shown, the molecule exhibits a crystalline phase until it melts to a Smetic phase, followed by further melting into a Nematic state, and finally melting into an amorphous (Isotropic) state. Upon cooing, the liquid crystalline material solidifies back to the crystalline phase. In order to take advantage of the more mechanically robust Nematic state, the present embodiments freeze this state by applying an electric field after jetting and until the applied ink solidifies.

Figure 3:
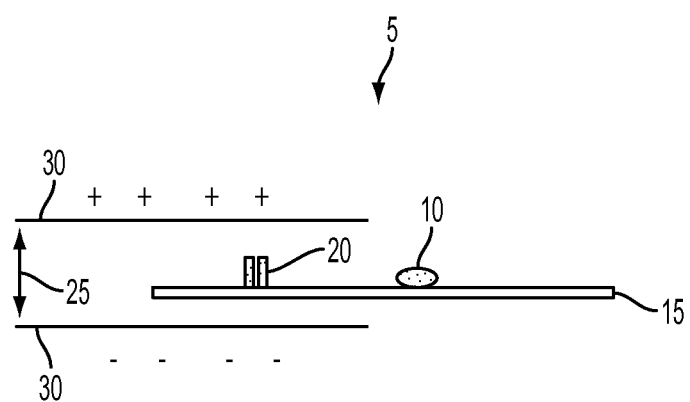
FIG. 3 is an illustration of one exemplary process of using the solid ink of the present embodiments.

The process 5 of using the solid ink of the present embodiments is shown in FIG. 3. As seen, solid ink is jetted 10 onto a substrate 15, such as paper. In embodiments, the ink is jetted at a temperature of from about 60 to about 140° C., or from about 80 to about 120° C., or from about 90 to about 110° C. At such temperatures, the viscosity of the solid ink is from about 1 to about 20 cps, or from about 4 to about 15 cps, or from about 5 to about 12 cps. Upon cooling, the jetted ink 10 changes to the Nematic state during which liquid crystal alignment 20 is achieved by exposing the jetted ink 10 to an electrostatic field 25. In embodiments, the applied electrostatic field is from about 10 to about 5,000 volts, or from about 100 to about 2000 volts, or from about 400 to about 1000 volts. The field is applied for a time ranging from about 1 to about 20 seconds, or from about 5 to about 10, or from about 5 to about 10 seconds. The electrostatic field 25 can be applied with an external power supply (not shown) using two conductive plates 30, with the ink film and the substrate placed in between the conductive plates 30.

The jetted ink 10 reaches the Nematic state at a temperature of from about 20 to about 120 C, or from about 40 to about 100° C., or from about 50 to about 95° C. At such temperatures, the viscosity of the solid ink is from about 5 to about 5000 cps, or from about 5 to about 500 cps, or from about 10 to about 1000 cps. The jetted ink is frozen into the final crystalline state with the applied liquid crystal alignment at a temperature of from about 20 to about 120° C., or from about 20 to about 100° C., or from about 20 to about 80 C. At such temperatures, the viscosity of the solid ink is from about 10 to about 10,000 cps, or from about 10 to about 5,000 cps, or from about 10 to about 2,000 cps. As a result of the molecular orientation, a more mechanically robust image is achieved.

Liquid Crystalline Materials

In the present embodiments, the liquid crystalline materials are selected from the group consisting of two or more aromatic, heteroaromatic or cycloaliphatic rings, usually benzene rings, separated by a single bond, such a 4,4' Biphenylenes, or fused together such as naphthalenes, or have one or two bridging groups that bind the rings together, such as oxygen, carbon, or nitrogen bridging group or ester, amide bridging group. Additionally, the aromatic groups have one or more substituted aliphatic or heteroatom moiety. Examples of liquid crystalline materials can be found in the handbook of Liquidcrystals, by Han Kelker and Rolf Hatz (Verlag Chemie, 1980, and the Handbook of Liquid Crystal 4 volume Set by Dietrich Demus et al. (Wiley, 1998), the disclosures of which are totally incorporated herein by reference. More specifically, specific liquid crystalline materials are selected with nematic or smectic phase transitions in the range of 20 to about 140° C., such as Trans-trans-4'alkyl-4-cyanobicyclohexys, p-ethoxybenzylidene-p-n-butylaniline, anisylidine-p-aminophenylacetate, p-cyanobenzylidene-p-n-octyloxyaniline, p,p'-di-dodecyloxyazoxybenzene, azomethines such as 4-butyl-N-(4-ethoxybenzylidene)aniline, 4-butyl-N-(4-methoxybenzylidene)aniline, or 4-butoxy-N-(4-butylbenzylidene)aniline, azobenzene derivatives such as p-methoxy-p'caproyloxazobenzene, p-ethoxy-p'caproyloxazobenzene, p-ethoxy-p'heptanoyloxazobenzene, p-ethoxy-p'undecenoyloxazobenzene, p,p'Di-n-heptyloxyazoxybenzene, phenylbenzoates such as 1,4-phenylene bis(4-methoxybenzoate), 1,4-phenylene bis(4-ethoxybenzoate), 2-chloro-1,4-phenylene bis(4-methoxybenzoate), 2-methyl-1,4-phenylene bis(4-methoxybenzoate), hetro substituted naphthalenes such as diethyl naphthalene-2,6-dicarboxylate, dipropyl naphthalene-2,6-dicarboxylate, dimethyl 3-chloronaphthalene-2,6-dicarboxylate, 2-Acetyl-6-methoxynaphthalene, fluorenes such as 2,7-disubstituted flurenes, p,p'-disubstituted phenyl benzoates, p-phenyl-2-naphthoates, biphenyl cinnamates, substituted diphenyl terephthalates, p-phenylbenzylphenyl ethers, styrylbenzthiazoles, p-substituted-cinnamic acids and esters, and mixtures thereof.

In embodiments, the solid inks meet certain specific physical properties. For example, the solid inks of the present embodiments have a melting point $(T_{melt})<150°$ C. or from about 60° C. to about 140° C., or from about 70° C. to about 130° C. In other embodiments, the ink has a $T_{crys}>30°$ C. or from about 30° C. to about 110° C., or from about 50° C. to about 80° C. In other embodiments, the ink of the present embodiments has a viscosity of from about 1 to about 22 cps in a jetting range of from about 100 to about 140° C. In particular, the ink of the present embodiments has a viscosity at 140° C. of <12 cps or from about 12 cps to about 3 cps, or from about 10 cps to about 5 cps. The ink may have a viscosity of greater than about $10^6$ cps at room temperature.

The liquid crystalline materials show sharp crystallization, relatively low viscosity ($\leq 10^1$ centipoise (cps), or from about 0.5 to about 20 cps, or from about 1 to about 15 cps at a temperature of about 120 to 140° C., but very high viscosity (>$10^6$ cps) at room temperature. These materials have a melting temperature ($T_{melt}$) of less than 120° C., or from about 30 to about 120° C., or from about 40 to about 120° C., and a crystallization temperature ($T_{crys}$) of greater than 50° C., or from about 50 to about 120° C., or from about 60 to about 100° C. The $\Delta T$ between $T_{melt}$ and $T_{crys}$ is less than about 60° C.

In embodiments, the liquid crystalline material is present in an amount of from about 60 to about 99 percent, or from about 70 to about 98 percent, or from about 80 to about 98 percent by weight of the total weight of the ink composition.

Additives

The ink of embodiments may further include conventional additives to take advantage of the known functionality associated with such conventional additives. Such additives may include, for example, at least one antioxidant, defoamer, slip and leveling agents, clarifier, viscosity modifier, adhesive, plasticizer and the like.

The ink may optionally contain antioxidants to protect the images from oxidation and also may protect the ink components from oxidation while existing as a heated melt in the ink reservoir. Examples of suitable antioxidants include N,N'-hexamethylene bis(3,5-di-tert-butyl-4-hydroxy hydrocinnamamide) (IRGANOX 1098, available from BASF); 2,2-bis (4-(2-(3,5-di-tert-butyl-4-hydroxyhydrocinnamoyloxy)) ethoxyphenyl)propane (TOPANOL-205, available from Vertellus); tris(4-tert-butyl-3-hydroxy-2,6-dimethyl benzyl)isocyanurate (Aldrich); 2,2'-ethylidene bis(4,6-di-tert-butylphenyl)fluoro phosphonite (ETHANOX-398, available from Albermarle Corporation); tetrakis(2,4-di-tert-butylphenyl)-4,4'-biphenyl diphosphonite (Aldrich); pentaerythritol tetrastearate (TCI America); tributylammonium hypophosphite (Aldrich); 2,6-di-tert-butyl-4-methoxyphenol (Aldrich); 2,4-di-tert-butyl-6-(4-methoxybenzyl)phenol (Aldrich); 4-bromo-2,6-dimethylphenol (Aldrich); 4-bromo-3,5-didimethylphenol (Aldrich); 4-bromo-2-nitrophenol (Aldrich); 4-(diethyl aminomethyl)-2,5-dimethylphenol (Aldrich); 3-dimethylaminophenol (Aldrich); 2-amino-4-tert-amylphenol (Aldrich); 2,6-bis(hydroxymethyl)-p-cresol (Aldrich); 2,2'-methylenediphenol (Aldrich); 5-(diethylamino)-2-nitrosophenol (Aldrich); 2,6-dichloro-4-fluorophenol (Aldrich); 2,6-dibromo fluoro phenol (Aldrich); α-trifluoro-o-cresol (Aldrich); 2-bromo-4-fluorophenol (Aldrich); 4-fluorophenol (Aldrich); 4-chlorophenyl-2-chloro-1,1,2-trifluoroethyl sulfone (Aldrich); 3,4-difluoro phenylacetic acid (Adrich); 3-fluorophenylacetic acid (Aldrich); 3,5-difluoro phenylacetic acid (Aldrich); 2-fluorophenylacetic acid (Aldrich); 2,5-bis(trifluoromethyl)benzoic acid (Aldrich); ethyl-2-(4-(4-(trifluoromethyl)phenoxy)phenoxy)propionate (Aldrich); tetrakis(2,4-di-tert-butyl phenyl)-4,4'-biphenyl diphosphonite (Aldrich); 4-tert-amyl phenol (Aldrich); 3-(2H-benzotriazol-2-yl)-4-hydroxy phenethylalcohol (Aldrich); NAUGARD 76, NAUGARD 445, NAUGARD 512, and NAUGARD 524 (manufactured by Chemtura Corporation); and the like, as well as mixtures thereof. The antioxidant, when present, may be present in the ink in any desired or effective amount, such as from about 0.25 percent to about 10 percent by weight of the ink or from about 1 percent to about 5 percent by weight of the ink.

Colorants

In embodiments, the solid ink compositions described herein also include a colorant. The ink of the present embodiments can thus be one with or without colorants. The solid ink may optionally contain colorants such as dyes or pigments. The colorants can be either from the cyan, magenta, yellow, black (CMYK) set or from spot colors obtained from custom color dyes or pigments or mixtures of pigments. Dye-based colorants are miscible with the ink base composition, which comprises the crystalline and amorphous components and any other additives.

In embodiments, the solid ink compositions described herein also include a colorant. Any desired or effective colorant can be employed in the solid ink compositions, including dyes, pigments, mixtures thereof, and the like, provided that the colorant can be dissolved or dispersed in the ink carrier. Any dye or pigment may be chosen, provided that it is capable of being dispersed or dissolved in the ink carrier and is compatible with the other ink components. The solid carrier compositions can be used in combination with conventional solid ink colorant materials, such as Color Index (C.I.) Solvent Dyes, Disperse Dyes, modified Acid and Direct Dyes, Basic Dyes, Sulphur Dyes, Vat Dyes, and the like. Examples of suitable dyes include Neozapon Red 492 (BASF); Orasol Red G (Pylam Products); Direct Brilliant Pink B (Oriental Giant Dyes); Direct Red 3BL (Classic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bemachrome Yellow GD Sub (Classic Dyestuffs); Cartasol Brilliant Yellow 4GF (Clariant); Cibanone Yellow 2G (Classic Dyestuffs); Orasol Black RLI (BASF); Orasol Black CN (Pylam Products); Savinyl Black RLSN (Clariant); Pyrazol Black BG (Clariant); Morfast Black 101 (Rohm & Haas); Diaazol Black RN (ICI); Thermoplast Blue 670 (BASF); Orasol Blue GN (Pylam Products); Savinyl Blue GLS (Clariant); Luxol Fast Blue MBSN (Pylam Products); Sevron Blue 5GMF (Classic Dyestuffs); Basacid Blue 750 (BASF); Keyplast Blue (Keystone Aniline Corporation); Neozapon Black X51 (BASF); Classic Solvent Black 7 (Classic Dyestuffs); Sudan Blue 670 (C.I. 61554) (BASF); Sudan Yellow 146 (C.I. 12700) (BASF); Sudan Red 462 (C.I. 26050) (BASF); C.I. Disperse Yellow 238; Neptune Red Base NB543 (BASF, C.I. Solvent Red 49); Neopen Blue FF-4012 (BASF); Fatsol Black BR (C.I. Solvent Black 35) (Chemische Fabriek Triade BV); Morton Morplas Magenta 36 (C.I. Solvent Red 172); metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are herein entirely incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactint Orange X-38, uncut Reactint Blue X-17, Solvent Yellow 162, Acid Red 52, Solvent Blue 44, and uncut Reactint Violet X-80.

Pigments are also suitable colorants for the solid inks. Examples of suitable pigments include PALIOGEN Violet 5100 (BASF); PALIOGEN Violet 5890 (BASF); HELIOGEN Green L8730 (BASF); LITHOL Scarlet D3700 (BASE); SUNFAST Blue 15:4 (Sun Chemical); Hostaperm Blue B2G-D (Clariant); Hostaperm Blue B4G (Clariant); Permanent Red P-F7RK; Hostaperm Violet BL (Clariant); LITHOL Scarlet 4440 (BASF); Bon Red C (Dominion Color Company); ORACET Pink RF (BASF); PALIOGEN Red 3871 K (BASF); SUNFAST Blue 15:3 (Sun Chemical); PALIOGEN Red 3340 (BASF); SUNFAST Carbazole Violet 23 (Sun Chemical); LITHOL Fast Scarlet L4300 (BASF); SUNBRITE Yellow 17 (Sun Chemical); HELIOGEN Blue L6900, L7020 (BASF); SUNBRITE Yellow 74 (Sun Chemical); SPECTRA PAC C Orange 16 (Sun Chemical); HELIOGEN Blue K6902, K6910 (BASF); SUNFAST Magenta 122 (Sun Chemical); HELIOGEN Blue D6840, D7080 (BASF); Sudan Blue OS (BASF); NEOPEN Blue FF4012 (BASF); PV Fast Blue B2GO1 (Clariant); IRGALITE Blue GLO (BASF); PALIOGEN Blue 6470 (BASF); Sudan Orange G (Aldrich); Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Ink Jet Yellow 4G VP2532 (Clariant); Toner Yellow HG (Clariant); Lumogen Yellow D0790 (BASF); Suco-Yellow L1250 (BASF); Suco-Yellow D1355 (BASF); Suco Fast Yellow D1355, D1351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT); PALIOGEN Black L0084 (BASF); Pigment Black K801 (BASF); and carbon blacks such as REGAL 33Q™ (Cabot), Nipex 150 (Evonik) Carbon Black 5250 and Carbon Black 5750 (Columbia Chemical), and the like, as well as mixtures thereof.

Pigment dispersions in the ink base may be stabilized by synergists and dispersants. Generally, suitable pigments may be organic materials or inorganic. Magnetic material-based pigments are also suitable, for example, for the fabrication of robust Magnetic Ink Character Recognition (MICR) inks. Magnetic pigments include magnetic nanoparticles, such as for example, ferromagnetic nanoparticles.

Also suitable are the colorants disclosed in U.S. Pat. No. 6,472,523, U.S. Pat. No. 6,726,755, U.S. Pat. No. 6,476,219, U.S. Pat. No. 6,576,747, U.S. Pat. No. 6,713,614, U.S. Pat. No. 6,663,703, U.S. Pat. No. 6,755,902, U.S. Pat. No. 6,590,082, U.S. Pat. No. 6,696,552, U.S. Pat. No. 6,576,748, U.S. Pat. No. 6,646,111, U.S. Pat. No. 6,673,139, U.S. Pat. No. 6,958,406, U.S. Pat. No. 6,821,327, U.S. Pat. No. 7,053,227, U.S. Pat. No. 7,381,831 and U.S. Pat. No. 7,427,323, the disclosures of each of which are incorporated herein by reference in their entirety.

In embodiments, solvent dyes are employed. An example of a solvent dye suitable for use herein may include spirit soluble dyes because of their compatibility with the ink carriers disclosed herein. Examples of suitable spirit solvent dyes include Neozapon Red 492 (BASF); Orasol Red G (Pylam Products); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow 5RA EX (Classic Dyestuffs); Orasol Black RLI (BASF); Orasol Blue GN (Pylam Products); Savinyl Black RLS (Clariant); Morfast Black 101 (Rohm and Haas); Thermoplast Blue 670 (BASF); Savinyl Blue GLS (Sandoz); Luxol Fast Blue MBSN (Pylam); Sevron Blue 5GMF (Classic Dyestuffs); Basacid Blue 750 (BASF); Keyplast Blue (Keystone Aniline Corporation); Neozapon Black X51 (C.I. Solvent Black, C.I. 12195) (BASF); Sudan Blue 670 (C.I. 61554) (BASF); Sudan Yellow 146 (C.I. 12700) (BASF); Sudan Red 462 (C.I. 260501) (BASF), mixtures thereof and the like.

The colorant may be present in the solid ink in any desired or effective amount to obtain the desired color or hue such as, for example, at least from about 0.1 percent by weight of the ink to about 50 percent by weight of the ink, at least from about 0.2 percent by weight of the ink to about 20 percent by weight of the ink, and at least from about 0.5 percent by weight of the ink to about 10 percent by weight of the ink.

The ink compositions can be prepared by any desired or suitable method. For example, each of the components of the ink carrier can be mixed together, followed by heating, the mixture to at least its melting point, for example from about 60° C. to about 150° C., 80° C. to about 145° C. and 85° C. to about 140° C. The colorant may be added before the ink ingredients have been heated or after the ink ingredients have been heated. When pigments are the selected colorants, the molten mixture may be subjected to grinding in an attritor or media mill apparatus to effect dispersion of the pigment in the ink carrier. The heated mixture is then stirred for about 5 seconds to about 30 minutes or more, to obtain a substantially homogeneous, uniform melt, followed by cooling the ink to ambient temperature (typically from about 20° C. to about 25° C.). The inks are solid at ambient temperature. The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. In another specific embodiment, both the intermediate transfer member and the final recording sheet are heated; in this embodiment, both the intermediate transfer member and the final recording sheet are heated to a temperature below that of the melted ink in the printing apparatus; in this embodiment, the relative temperatures of the intermediate transfer member and the final recording sheet can be (1) the intermediate transfer member is heated to a temperature above that of the final recording substrate and below that of the melted ink in the printing apparatus; (2) the final recording substrate is heated to a temperature above that of the intermediate transfer member and below that of the melted ink in the printing apparatus; or (3) the intermediate transfer member and the final recording sheet are heated to approximately the same temperature. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Solid inks as disclosed herein can also be used in printing processes other than hot melt ink jet printing processes.

Any suitable substrate or recording sheet can be employed, including plain papers such as XEROX 4200 papers, XEROX Image Series papers, Courtland 4024 DP paper, ruled notebook paper, bond paper, silica coated papers such as Sharp Company silica coated paper, JuJo paper, HAMMERMILL LASERPRINT paper, and the like, glossy coated papers such as XEROX Digital Color Elite Gloss, Sappi Warren Papers LUSTROGLOSS, specialty papers such as Xerox DURAPAPER, and the like, transparency materials, fabrics, textile products, plastics, polymeric films, inorganic recording mediums such as metals and wood, and the like, transparency materials, fabrics, textile products, plastics, polymeric films, inorganic substrates such as metals and wood, and the like.

The inks described herein are further illustrated in the following examples. All parts and percentages are by weight unless otherwise indicated.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

A set of four inks based on 2-Acetyl-6-methoxynaphthalene crystalline material with tris-butyl carbamoyl triazine (TBCT) as the amorphous component and a TBCT pigment dispersion. The exemplary inks had 0%, 10%, 15% and 20% TBCT with the crystalline material as described below.

Example Ink 1

Preparation of Solid Ink Comprising 0% TBCT (100 Crystalline)

A pigment-based ink was prepared with 100% of the novel crystalline material with a formulation shown in Table 1.

TABLE 1

| Component | wt % | m (g) |
| --- | --- | --- |
| 2-Acetyl-6-methoxynaphthalate | 98 | 4.9 |
| TBCT | 0 | 0 |
| Solvent Blue 1010 | 2 | 0.1 |
| | 100 | 5 |

Into a 30 mL amber bottle was charged, in the following order: 2-Acetyl-6-methoxynaphthalene (4.9 gram) and Solvent Blue 1010 (0.1 gram). The materials was melted at 140°

C. and stirred using a magnetic stir bar for 30 minutes after which, the ink was stirred for an additional 1 hour at 140° C., poured in an Aluminum tray and cooled to room temperature.

Example Ink 2

Preparation of Solid Ink Comprising 10% TBCT (90 Crystalline:10 Amorphous)

A pigment-based ink was prepared with 90% of the novel crystalline material with a formulation shown in Table 2.

TABLE 2

| Component | wt % | m (g) |
|---|---|---|
| 2-Acetyl-6-methoxynaphthalate | 86.02 | 4.301 |
| TBCT | 0.58 | 0.029 |
| Pigment concentrate B4G | 13.04 | 0.67 |
| | 100 | 5 |

Into a 30 mL amber bottle was charged, in the following order: 2-Acetyl-6-methoxynaphthalene (4.301 gram), TBCT (0.029 gram) Pigment concentrate B4G (0.67 gram). The materials was melted at 140° C. and stirred using a magnetic stir bar for 30 minutes after which, the ink was stirred for an additional 1 hour at 140° C., poured in an Aluminum tray and cooled to room temperature.

Example Ink 3

Preparation of Solid Ink Comprising 15% TBCT (85 Crystalline:15 Amorphous)

A pigment-based ink was prepared with 85% of the novel crystalline material with a formulation shown in Table 3.

TABLE 3

| Component | wt % | m (g) |
|---|---|---|
| Crystalline DST | 81.24 | 4.062 |
| TBCT | 5.36 | 0.268 |
| Pigment concentrate B4G | 13.4 | 0.67 |
| | 100 | 5 |

Into a 30 mL amber bottle was charged, in the following order: 2-Acetyl-6-methoxynaphthalene (4.062 gram), TBCT (0.268 gram) Pigment concentrate B4G (0.67 gram). The materials was melted at 140° C. and stirred using a magnetic stir bar for 30 minutes after which, the ink was stirred for an additional 1 hour at 140° C., poured in an Aluminum tray and cooled to room temperature.

Example Ink 4

Preparation of Solid Ink Comprising 20% TBCT (80 Crystalline:20 Amorphous)

A pigment-based ink was prepared with 80% of the novel crystalline material with a formulation shown in Table 4.

TABLE 4

| Component | wt % | m (g) |
|---|---|---|
| Crystalline DST | 76.46 | 3.823 |
| TBCT | 10.14 | 0.507 |
| Pigment concentrate B4G | 13.4 | 0.67 |
| | 100 | 5 |

Into a 30 mL amber bottle was charged, in the following order: 2-Acetyl-6-methoxynaphthalene (3.823 gram), TBCT (0.507 gram) Pigment concentrate B4G (0.67 gram). The materials was melted at 140° C. and stirred using a magnetic stir bar for 30 minutes after which, the ink was stirred for an additional 1 hour at 140° C., poured in an Aluminum tray and cooled to room temperature.

Inks 1 to 4 were printed onto Xerox® Digital Color Elite Gloss, 120 gsm (DCEG) coated papers using the K-proofer gravure printing plate, which is rigged with a pressure roll set at low pressure. The gravure plate temperature was set at 142° C., but the actual plate temperature was about 134° C. The K-proofer apparatus (manufactured by RK Print Coat Instrument Ltd., Litlington, Royston, Heris, SG8 0OZ, U.K.) is a useful printing tool to screen a variety of inks at small scale and to assess image quality on various substrates. All of the the inks gave robust images that could not be easily removed from the substrates. When a metal tip with a curved tip at an angle of about 15° from vertical, with a weight of 528 g applied, was drawn across the image at a rate of approximately 13 mm/s no ink was visibly removed from the image. The tip is similar to a lathe round nose cutting bit with radius of curvature of approximately 12 mm.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:
1. A solid ink composition comprising:
   a liquid crystalline component; and
   an optional colorant, wherein the solid ink composition is a solid at room temperature and liquid at a temperature of 80° C. or higher and the solid ink composition is a single carrier component ink composition.
2. The solid ink composition of claim 1, wherein the liquid crystalline component is selected from the group consisting of Trans-trans-4'alkyl-4-cyanobicyclohexys, p-ethoxybenzylidene-p-n-butylaniline, anisylidine-p-aminophenylacetate, p-cyanobenzylidene-p-n-octyloxyaniline, p,p'-didodecyloxyazoxybenzene, azomethines, azobenzene derivatives, phenylbenzoates, hetro substituted naphthalenes, fluorenes, p,p'-disubstituted phenyl benzoates, p-phenyl-2-naphthoates, biphenyl cinnamates, substituted diphenyl terephthalates, p-phenylbenzylphenyl ethers, styrylbenzthiazoles, p-substituted-cinnamic acids and esters, and mixtures thereof.
3. The solid ink composition of claim 1, wherein the liquid crystalline component is present in the solid ink composition in an amount of from about 60 to about 98 percent by total weight of the weight of the solid ink composition.

4. The solid ink composition of claim 3, wherein the liquid crystalline component is present in the solid ink composition in an amount of from about 70 to about 98 percent by total weight of the weight of the solid ink composition.

5. The solid ink composition of claim 1, wherein the liquid crystalline material melts into a smectic phase at a temperature of from about 40 to about 100 degrees centigrade.

6. The solid ink composition of claim 5 having a viscosity of from about 100 to about 100,000 cps when the liquid crystalline material is in the smectic phase.

7. The solid ink composition of claim 1, wherein the liquid crystalline material melts into a nematic phase at a temperature of from about 60 to about 120 degrees centigrade.

8. The solid ink composition of claim 7 having a viscosity of from about 5 to about 100 cps when the liquid crystalline material is in the nematic phase.

9. The solid ink composition of claim 7, wherein a molecular structure of the liquid crystalline material can be aligned by application of an electrostatic field during the nematic or smectic phase.

10. The solid ink composition of claim 7, wherein the applied electrostatic field has a charge of from about 100 to about 2,000 volts.

11. The solid ink composition of claim 1, wherein the liquid crystalline material melts into an isotropic phase at a temperature of from about 80 to about 140 degrees centigrade.

12. The solid ink composition of claim 11 having a viscosity of from about 1 to about 15 cps when the liquid crystalline material is in the isotropic phase.

13. The solid ink composition of claim 1, wherein the optional colorant is selected from the group consisting of a pigment, dye or mixtures thereof.

14. The solid ink composition of claim 1 further comprising an additive selected from the group consisting of antioxidant, defoamer, slip and leveling agents, clarifier, viscosity modifier, adhesive, plasticizer and mixtures thereof.

15. A solid ink composition comprising:
   a liquid crystalline component, wherein the liquid crystalline component is selected from the group consisting of trans-trans-4'alkyl-4-cyanobicyclohexys, p-ethoxybenzylidene-p-n-butylaniline, anisylidine-p-aminophenylacetate, p-cyanobenzylidene-p-n-octyloxyaniline, p,p'-di-dodecyloxyazoxybenzene, azomethines, azobenzene derivatives, phenylbenzoates, hetro substituted naphthalenes, fluorenes, p,p'-disubstituted phenyl benzoates, p-phenyl-2-naphthoates, biphenyl cinnamates, substituted diphenyl terephthalates, p-phenylbenzylphenyl ethers, styrylbenzthiazoles, p-substituted-cinnamic acids and esters, and mixtures thereof; and
   an optional colorant, wherein the solid ink composition is a solid at room temperature and liquid at a temperature of 80° C. or higher and the solid ink composition is a single carrier component ink composition.

16. A process of using a solid ink composition comprising:
   jetting a solid ink composition onto a substrate to form an ink film on the substrate at a temperature of from about 60 to about 140° C., the solid ink composition comprising
      a liquid crystalline component, and
      an optional colorant, wherein the solid ink composition is a solid at room temperature and liquid at a temperature of 80° C. or higher and further wherein the liquid crystalline component is in a nematic or isotropic phase when jetted;
   cooling the ink film to a temperature of from about 40 to about 100° C., wherein the liquid crystalline component is in a smectic or crystalline phase;
   exposing the ink film to an electrostatic field to align the liquid crystals of the liquid crystalline component; and
   further cooling the ink film to a temperature of from about 20 to about 40° C., wherein the liquid crystalline component is in an isotropic phase.

17. The process of claim 16, wherein the applied electrostatic field has a charge of from about 100 to about 2,000 volts.

18. The process of claim 16, wherein the electrostatic field is applied for a time ranging from about 1 second to about 10 seconds.

19. The process of claim 16, wherein the electrostatic field is applied with a power supply and conductive plates wherein the ink film and the substrate are in between the conductive plates.

20. The process of claim 16, wherein liquid crystalline material is selected from the group consisting of diethyl naphthalene-2,6-dicarboxylate, dipropyl naphthalene-2,6-dicarboxylate, dimethyl 3-chloronaphthalene-2,6-dicarboxylate, 2-Acetyl-6-methoxynaphthalene and mixtures thereof.

* * * * *